United States Patent

[11] 3,604,115

[72] Inventor Harrison M. McDonald
De Kalb, Ill.
[21] Appl. No. 854,352
[22] Filed Aug. 15, 1969
[45] Patented Sept. 14, 1971
[73] Assignee Ideal Industries, Inc.
Sycamore, Ill.
Continuation-in-part of application Ser. No. 622,546, Mar. 13, 1967, now abandoned, which is a continuation-in-part of application Ser. No. 584,399, Oct. 5, 1966, now Patent No. 3,416,227.

[54] PRECISION STRIPPER BLADE
3 Claims, 5 Drawing Figs.

[52] U.S. Cl. .................................................... 30/348
[51] Int. Cl. .................................................... B26b 17/04
[50] Field of Search .......................................... 30/168,
346.58, 348, 346.59, 346.60, 91.2; 76/104; 81/9.5

[56] References Cited
UNITED STATES PATENTS
3,151,509 10/1964 Gormley ...................... 30/179 X
3,279,283 10/1966 Craig ........................... 76/104

FOREIGN PATENTS
877,157 9/1961 Great Britain ................ 30/168

Primary Examiner—Lester M. Swingle
Assistant Examiner—J. C. Peters
Attorney—Parker, Carter & Markey ABSTRACT: A stripper blade for use in removing the insulation from one end of an insulated wire and having a cutting knife mounted in an integrally molded supporting structure; the cutting knife has a cutting edge formed with a plurality of notches.

A method of fabricating stripper blades having the steps of forming a cutting knife, inserting the cutting knife in a mold cavity, inserting mold material into the mold cavity, solidifying the mold material, and ejecting the molded stripper blade from the mold cavity.

A mold for use in fabricating stripper blades and having a mold bottom, a mold cover and removable knockout pins adapted to close in registry to form a mold cavity having the contour of the desired molded stripper blade; one removable knockout pin contains molding means and a groove adapted to receive a cutting knife and align the cutting knife in cooperation with registry and alignment pins formed in the mold cover and bottom.

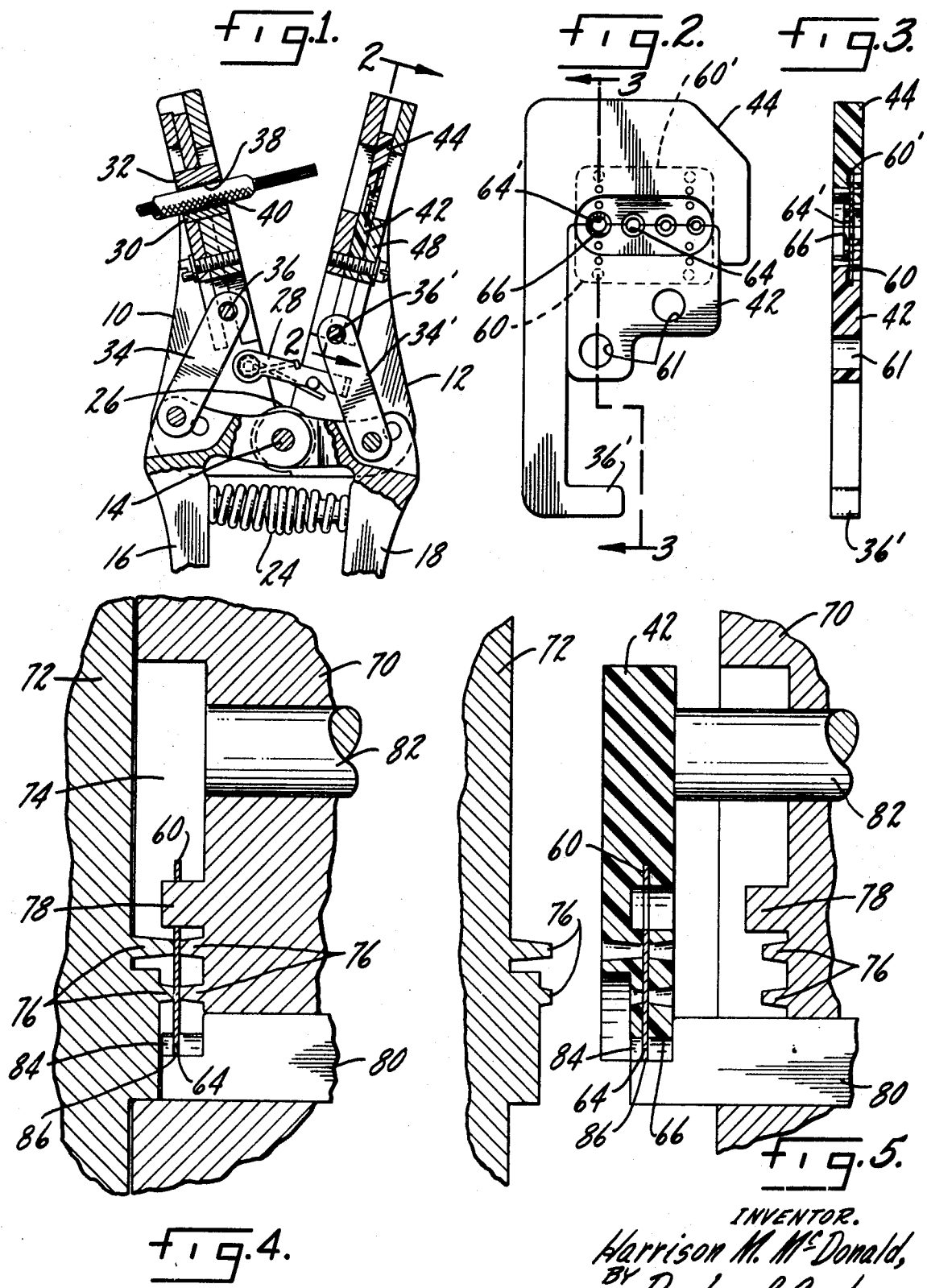

3,604,115

PRECISION STRIPPER BLADE

This application is a continuation-in-part of my copending application Ser. No. 622,546, filed Mar. 13, 1967, now abandoned, which was a continuation-in-part of my copending application Ser. No. 584,399, filed Oct. 5, 1966, and now U.S. Pat. No. 3,416,227

SUMMARY OF THE INVENTION

This invention is in the field of wire strippers and is primarily concerned with a stripper blade for use in a hand-operated stripper, although it should be understood that most, if not all, of the features of this invention could be used as well in other types of strippers, for example bench-mounted strippers and/or power-operated units and the like.

In stripping insulation from insulated wire which is to be used in electronic equipment in the defense and other industries requiring highly reliable equipment, it is essential that the insulation be stripped from such wire without nicking and thereby weakening such wire's inner metallic conductor. In fabricating stripper blades for use in hand or power-operated strippers, it is desirable to have a process whereby costly machining operations in forming the wire-stripping areas of the blade are eliminated and whereby stripper blades may be fabricated individually and not as matched pairs. Further, it is highly desirable to have an economical method of fabricating precision stripper blades for use in stripping special wire forms, such as television antenna wire and the like.

Therefore, one object of this invention is a highly precise and accurate stripper blade for either hand or power-operated strippers which will strip insulation from wire without nicking the inner metallic conductor.

Another object is a stripper blade which may be molded out of plastic or other suitable material.

Another object is a stripper blade which insures accurate lateral centering of the cutting edge of such blade about the wire which is to be stripped.

Another object is a stripper blade which may be fabricated using an injection molding machine.

Another object is a stripper blade having a cutting edge consisting of a thin metal insert.

Another object is a stripper blade having a cutting edge which does not require sharpening.

Another object is a method of molding precision stripper blades.

Another object is a method of fabricating stripper blades which results in a uniform, interchangeable end product.

Another object is an economical method which facilitates the production of special stripper blades for stripping insulation from special wire shapes such as television antenna wire and the like.

Another object is a mold for producing stripper blades which facilitates fabrication of variously configured stripper blades.

Another object is a mold, for use in fabricating stripper blades, having multiple collet mold inserts which allows the use of the same mold in producing stripper blades, respectively having different wire size and form-stripping capabilities.

Another object is a stripper blade formed using plastic or other self-lubricating material to eliminate lubrication problems between the moving blade and the wire stripper mounting frame.

Another object is an economical method of manufacturing stripper blades having cutting means which would be extremely difficult and expensive to produce by machining.

Another object is a stripper blade and a method of manufacture which permits the economical use of a carbide cutting edge.

Other objects will appear in the ensuing specification, drawings and claims.

Brief Description of the Drawings

FIG. 1 is a plan view in partial cross section of a hand-type wire stripper utilizing an exemplary pair of stripper blades of this invention;

FIG. 2 is an enlarged view taken along line 2—2 of FIG. 1;

FIG. 3 is a cross-sectional view taken along line 3—3 of FIG. 2;

FIG. 4 is a cross-sectional view of an exemplary die or mold used in the method of fabricating stripper blades of this invention; and FIG. 5 is a cross-sectional view showing a completed exemplary stripper blade being ejected from the mold of FIG. 4 after such mold parts have separated.

Description of the Preferred Embodiment

Referring now to the drawings, and particularly to FIG. 1, stripper blades 42 and 44 are shown mounted in a hand stripper of the type generally illustrated in U.S. Pat. No. 2,523,936 issued Sept. 26, 1950. It should be understood, however, that the stripper blade of this invention may also be used in bench strippers, such as shown in U.S. Pat. No. 2,239,755 issued Apr. 29, 1941, or other like devices for use in stripping insulation from wire. For details of the particular strippers mentioned, reference is made to the above patents. Generally, however, a wire stripper utilizing the stripper blades 42 and 44 includes a pair of body members or arms 10 and 12, pivoted together at 14, with such pivot also functioning as the pivot for a pair of legs or handles 16 and 18. The handles 16 and 18 are spring-biased apart by a suitable coil spring 24 or the like. A suitable coil spring, not shown, is provided in a housing 26 on the back pivot 14, each end of which is anchored into one of the arms 10 and 12 to bias such arms together at all times. A suitable latch 28, either between the arms or otherwise to initially resist or restrain the return movement of the arms 10 and 12, is provided to allow jaws 30 and 32 to open so that the wire can be removed after such wire has been stripped. For details of the latch operation, reference is made to U.S. Pat. No. 2,523,936.

The clamping jaws 30 and 32 are mounted in one arm 10, with the lower jaw 30 being stationary and the upper jaw 32 being movable in the up-down direction. To provide such movement, a link 34 is pivoted on one end of the handle 16 and at its other end on a pending tail 36 of the jaw 32. The opposed faces 38 and 40 of the clamping jaws grip and hold between them the outer insulation of the wire to be stripped. On the other arm 12, the stripper blades 42 and 44 are mounted, with the bottom blade 42 stationary and the top blade 44 being movable in the up-down direction. To provide such movement, a link 34' is pivoted on one end of the handle 18 and at its other end on a pending tail 36' of the stripper blade 44. The jaws 30 and 32 and the blades 42 and 44 are suitably held in place by retained plates, such as at 48.

With reference now to FIGS. 2 and 3, an exemplary operative set of stripper blades 42 and 44 of this invention have been shown as comprising a molded structure having a thin metal insert or cutting knife 60 and 60' respectively molded therein. The stripper blades 42 and 44 are shown configured for use in the hand stripper of FIG. 1, with the lower blade 42 being generally L-shaped and having two mounting holes 61, while the movable upper stripper blade 44 has been shown as being generally C-shaped. It should be understood, however, that the stripper blade of this invention is not limited to the shapes shown and may be of any general shape depending upon the requirements of the stripper with which such blade is to operate.

The cutting knives 60 and 60' contain notches or semicircular holes 64 and 64' respectively in the edges thereof. The diameter of the knife edge notch 64 or 64' is slightly larger than the diameter of the inner metallic conductor of the wire to be stripped. Associated with each knife edge notch is a collet, such as at 66, which is generally sized and configured to conform to the size and configuration of the insulation of the wire to be stripped. Although the collets have been shown as being generally circular, it should be understood that such collets may be molded to conform to specially configured wire, such as television antenna wire and the like. Further, although each blade is shown as having four sets of notches and collets, it should be understood that each stripper blade may have more or less than four sets of notches and collets. Further, although a stripper blade having collets and a notched, unsharpened metal insert has been depicted and has and will be described, it should be understood that this invention is not limited to such exemplary form. For example, the stripper blade of this invention may be colletless and the metal insert may be of any practical size and may have a sharpened single or double bevel cutting edge of a compound shape containing centering and/or locating bosses and notches.

In FIG. 4, an exemplary two-part mold with which the stripper blade of this invention may be molded has been shown. The numeral 70 indicated one-half of the mold which will be hereinafter referred to as the mold bottom. The numeral 72 indicates the mold cover. The mold bottom and cover contain recessed and extending areas such that when the mold bottom and cover are locked together, a cavity or chamber 74 is formed which conforms to the outlines of the finished stripper blade. The thin metal insert or cutting knife 60 is shown within the cavity 74 with such cutting knife being positioned laterally and vertically by the mold insert centering pins 76 and mold insert registry pins 78 respectively. The cutting knife is shown resting on and partially inserted in a removable collet mold insert and knockout pin 80. The collet mold insert and knockout pin 80 contains a plurality of collet molds 84, each of which has an outside contour conforming to the inside contour of the desired molded collet 66 of the finished stripper blade. Each collet mold 84 contains a peripheral groove 85 having a minor diameter approximately equal to the inside diameter of the knife edge notch 64 which is to be inserted therein. The depth of the groove 86 is made approximately equal to the thickness of the insulation of the wire to be stripped. The width of the groove 86 is made approximately equal to the thickness of the cutting knife 60 so that the cutting knife may be inserted into the groove, but, so that mold material will not flow into the groove after insertion of the cutting knife therein. The outside diameter of the groove 86 is located in relation to the collet mold 84 of the mold insert 80 so that the stripper blade collets, such as 66, of the finished stripper blade, are properly located in relation to the knife edge notches 64 or 64'.

Although a mold insert and knockout pin 80 configured for use in molding the exemplary colleted stripper blade has been depicted and described, it should be understood that such knockout pin may be configured to produce stripper blades having colletless cutting means.

In FIG. 5, a finished molded stripper blade 42 is shown being ejected from the mold bottom 70 after the mold cover 72 has been separated from such mold bottom, with such finished molded stripper blade being ejected from such mold cavity by an upper knockout pin 82 and the collet mold insert and knockout pin 80. Although a particular mold construction for molding the stripper blade of this invention has been described, it should be understood that other mold designs having, for example, different mold parting lines, different positioning of centering and registry pins could be used.

The stripper blade may also be formed by processes other than molding. What is important is to provide a laminated blade, or a blade formed of a thin cutting knife of sheet material, which may be on the order of 0.005 inch thick, embedded in a plastic or similar material. Joining of the laminates may be accomplished by bonding with an adhesive agent, or by other suitable means. For example, the blade 44 in FIG. 3, instead of having a plastic molded about a thin cutting knife, may have a pair of matching laminates, for example plastic, bonded to opposite sides of the knife, to embed the knife in the blade structure.

The use, operation and function of this invention are as follows:

The stripper blade of this invention is utilized in stripping wire by mounting a pair of such blades, such as 42 and 44, in a stripper such as shown in FIG. 1. The blades are positioned and mounted so that the notches and collets are symmetrically opposed and so that such blades may open and close relative to each other, with either both blades being movable or one blade fixed and one blade movable. The wire to be stripped is inserted between the open blades and the blades are closed about the wire so that the exposed half moon area of the cutting knife existing between the knife edge notch and the collet severs the wire insulation. The knife edge notch has a diameter slightly larger than the diameter of the inner metallic conductor of the wire to be stripped so that as the opposed blades are closed, the inner metallic conductor of the wire to be stripped is not nicked. The collets, such as 66, are provided to center the inner metallic conductor within the knife edge notch as the blades are closed.

The method of this invention by which the stripper blade is fabricated consists of forming a metal insert or cutting knife; mounting such cutting knife within a mold cavity; inserting mold material into the mold cavity; and curing and ejecting the finished stripper blade from such molded cavity.

The cutting knife 60 is formed by photoetching, stamping or other like suitable process using thin sheet material approximately 0.005 inch thick. The cutting knife may be made using hardened spring steel, a rigid plastic or other like material. The cutting edge may be carbide. In forming the cutting knife, registry holes are provided which align the cutting knife when the registry pins 78 of the mold bottom 70 are inserted through such holes. By using a thin cutting knife, the cutting edge of such knife does not require sharpening. Although it has been indicated that the cutting knife is approximately 0.005 inch thick and has an unsharpened cutting edge, and such is the preferred form, it should be understood that the cutting knife may be made of thicker material and may contain a sharpened single or double bevel cutting edge.

The cutting knife 60 is positioned within the mold by extending the collet mold and knockout pin 80 out of the mold bottom 70, as generally shown in FIG. 5; placing the notched edge of the cutting knife into the groove 86 of the collet mold and knockout pin 80, thereby positioning the cutting knife notches relative to their respective collet molds; withdrawing such collet mold insert into the mold bottom until the mold bottom registry pins 78 are engaged in the cutting knife registry holes and the cutting knife abuts the mold bottom centering pins 76; and placing the mold cover 72 upon the mold bottom, thereby vertically and laterally retaining the cutting knife within the mold cavity. With the cutting knife positioned and retained within the mold, mold material is inserted into the mold cavity, thereby forming the stripper blade body around the cutting knife.

The mold utilized in making the stripper blade of this invention contains a multifunction collet mold insert and knockout pin 80. Such mold part may serve as a mold for the collets; contains a groove 86 into which the cutting knife 60 is inserted, thereby registering the cutting edge notches with respect to the molded blade features; and serves as a knockout pin for use in ejecting the finished molded stripper blade from the mold bottom 70.

The collet mold insert and knockout pin 80 may be removed from the mold bottom 70 and replaced by a mold insert having differently configured collet molds or cutting means area mold, thereby permitting the mold bottom and cover 70 and 72 to be used in the production of variously configured stripper blades. For example, in producing a stripper blade for use in stripping television antenna wire, a collet mold insert 80 containing collet molds 84 which form collets conforming to television antenna wire would be inserted into the mold bottom 70, whereas, in producing stripper blades for use in stripping circular wire, a collet mold insert 80 having semicircular collet molds 84 would be inserted into the mold bottom 70.

By molding the stripper blade, special collet shapes for use in stripping insulation from special wire shapes such as television antenna wire and the like may be produced accurately and economically. Further, the collets may be molded with knurled inner surfaces to provide improved gripping action between the collets and the insulation to be removed.

The method of producing stripper blades disclosed herein results in uniform, accurate and interchangeable stripper blades. Therefore, should one blade of an operating pair of stripper blades become damaged, it is necessary only to replace the damaged blade.

The stripper blade may be molded using plastic or other like moldable material such as metallic particles with graphite or other lubricating material dispensed therethrough. By using plastic or other moldable self-lubricating material, lubrication problems between the moving blade and the wire stripper frame may be eliminated. Further, where the stripper blade design is such that either the insulation removed or left intact must slide from within the collets when the blades are closed, plastic or other self-lubricating material will provide a good sliding surface.

Another advantage of this invention is that it permits the economical use of a carbide-cutting edge on the stripper blade.

I claim:

1. A blade structure for use in a wire stripper in stripping insulation from insulated wire, the blade structure including a cutting knife in the form of a thin metal laminate on the order of approximately 0.005 of an inch thick embedded in a supporting structure, one edge of the metal laminate projecting beyond the supporting structure so as to expose a cutting edge, at least one generally circular unsharpened notch formed in the cutting edge of the laminate and being sized so as to generally conform to but being slightly larger than the inner metallic conductor of the wire to be stripped, the portion of the supporting structure adjacent the cutting edge notch being shaped to conform to the notch but spaced from it.

2. The structure of claim 1 further characterized in that the supporting structure is comprised of fused metallic particles.

3. The structure of claim 1 further characterized in that the supporting structure is made of nonmetallic plastic material.